United States Patent [19]

Martin

[11] 4,269,293

[45] May 26, 1981

[54] ENGINE ACCESSORY DISCONNECT

[75] Inventor: William B. Martin, Redondo Beach, Calif.

[73] Assignee: The Garrett Corporation, Los Angeles, Calif.

[21] Appl. No.: 17,678

[22] Filed: Mar. 5, 1979

[51] Int. Cl.³ .......................... F16D 1/00; F16D 11/04
[52] U.S. Cl. .................................... 192/35; 192/67 R; 192/94; 192/144
[58] Field of Search ................... 192/22, 24, 35, 67 R, 192/94, 101, 144; 188/166, 218 XL

[56] References Cited

U.S. PATENT DOCUMENTS

| 2,509,813 | 5/1950 | Dineen | 192/101 |
|---|---|---|---|
| 2,571,848 | 10/1951 | Ehlers | 192/67 R |
| 2,620,911 | 12/1952 | Krell | 192/141 |
| 2,642,970 | 6/1953 | Szekely | 192/24 |
| 2,802,555 | 8/1957 | Kalikow | 192/24 |
| 2,837,931 | 6/1958 | Brundage | 74/424.8 |
| 2,902,876 | 9/1959 | Pollock | 74/414 |
| 3,071,227 | 1/1963 | Grisier | 192/101 |
| 3,126,080 | 3/1964 | Travis et al. | 192/94 |
| 3,194,367 | 7/1965 | Winter | 192/35 X |
| 3,200,910 | 8/1965 | Cunningham et al. | 188/166 X |
| 3,211,250 | 10/1965 | Wood | 188/166 X |
| 3,220,218 | 11/1965 | Rio et al. | 192/22 X |
| 3,237,741 | 3/1966 | Potter et al. | 188/166 X |
| 3,262,535 | 7/1966 | DePasqua | 192/141 |
| 3,448,624 | 6/1969 | Brown | 74/10.2 |
| 3,539,043 | 11/1970 | Brochetti | 192/56 |
| 3,650,156 | 3/1972 | Thomas | 74/10.2 |
| 3,682,283 | 8/1972 | Sato | 192/141 |
| 3,741,527 | 6/1973 | Dahl | 254/168 |
| 4,128,144 | 12/1978 | Vassar | 188/166 X |

FOREIGN PATENT DOCUMENTS 2452203  5/1975 Fed. Rep. of Germany ........... 188/166

Primary Examiner—Rodney H. Bonck
Attorney, Agent, or Firm—Joel D. Talcott; J. Richard Konneker; Albert J. Miller

[57] ABSTRACT

A disconnect for disengaging an accessory rotor from a driving engine and quickly decelerating the accessory rotor to a stop.

33 Claims, 3 Drawing Figures

ENGINE ACCESSORY DISCONNECT

BACKGROUND OF THE INVENTION

The Government has rights in this invention pursuant to Contract No. N62269-76-C-0223 awarded by the Department of the Navy.

This invention relates to disconnects and, more particularly, to a device for disconnecting the rotor of an engine-driven accessory from its driving shaft upon malfunction of the accessory.

There are many applications where a driving and a driven device may be connected so that energy from the driving device may be used to operate an accessory system. For example, the rotating shaft of a turbine engine may be coupled to a generator for the production of electrical energy. However, malfunction of the accessory may necessitate rapid disconnecting of the accessory from the driving shaft. Otherwise, serious or irreparable damage may be done to the accessory or even to the driving engine. For example, should a bearing fail in a driven electrical generator, continued forced rotation for more than a few revolutions would produce a high likelihood of total destruction of the generator.

For this reason, accessory disconnects have been commonly utilized. Such disconnects conventionally employ a threaded shaft and an engaging nut. When a fault condition is sensed in the driven accessory, the nut is instantaneously stopped, by means such as jamming a pin against the shaft or into a gear tooth thereof. This action propels the shaft axially so that it is disconnected from a splined coupling with the accessory. The accessory then is permitted to free wheel until it stops.

Such devices have exhibited substantial problems. The rapid engagement of the nut by a pin results in the possibility of the nut being engaged by just the tip of the pin, thus having a negligible engagement area. The high resulting stress levels may cause damage to one of the engaging parts sufficient to prevent disconnect.

Further, instantaneous nut deceleration and shaft acceleration produce loadings whose magnitude is dependent on the mass-inertia of the component parts. These loadings materially exceed those required for overcoming the primary disconnect friction force. Further, the operation is accompanied by radial impact loads which have the effect of increasing the radial friction forces of the nut and screw and the axial friction forces of the drive splines. It is thus possible for such devices to fail to disengage the accessory from the engine. In the case of an airplane wherein such accessory may be coupled to the turbine engine which serves as the power plant, such failure to disconnect could be catatastrophic.

An additional problem in such prior art devices arises from the failure to rapidly terminate rotation of the defective accessory. By permitting the device to continue freewheeling, often with substantial inertia, a small defect may be substantially increased to the point where it requires major overhaul or even replacement of the accessory.

Examples of prior art accessory disconnects include U.S. Pat. Nos. 2,509,813; 2,642,970; 2,802,555; 3,071,227; and 3,126,080.

The engine accessory disconnect of this invention overcomes these and other related problems by utilizing a structure wherein a connecting screw is spline-coupled to the rotor of the accessory device and is connected by a releaseable spline coupling to a driving shaft of the engine. Instead of an impact engagement, the nut is slowed or stopped through frictional engagement by a caliper brake. Relative rotation of nut and connecting screw withdraws the connecting screw for release of its spline coupling with the driving shaft. After the nut has withdrawn the connecting screw to disconnect the accessory from the engines the nut engages a stop on the connecting screw so that continued frictional engagement of the brake rapidly terminates rotation of the driven shaft and, accordingly, operation of the driven accessory system. If desired, a reconnect spring may be provided and the threaded shaft and nut given a non-jamming thread with a large lead angle such that, upon release of the brake, the splined coupling of the connecting screw and the driving shaft will automatically reengage.

These and other advantages of this invention will be more readily apparent when the following detailed description is read in conjunction with the appended drawings, wherein.

Figure 1:
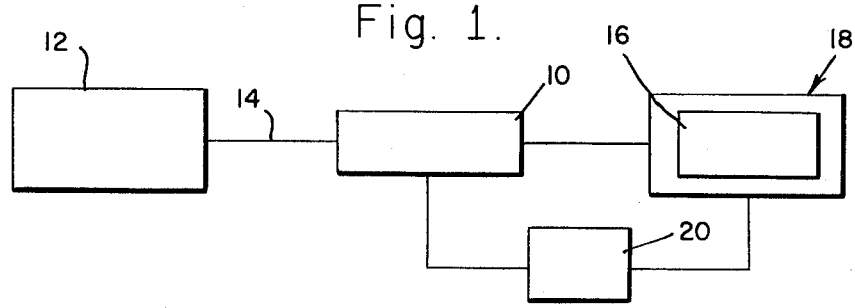
FIG. 1 is a schematic diagram illustrating connection of a driving engine to a driven accessory through a disconnect of this invention.

Referring now to the drawings, FIG. 1 illustrates schematically the use of an engine accessory disconnect 10 to couple a source of power, such as an engine 12 having a driving shaft 14 to a rotor 16 of an accessory 18. During normal operation, energy is transmitted from the engine 12 through shafts 14 and disconnect 10 to drive the accessory rotor 16. Shaft 14 may be a part of engine 12 but will, more likely, be coupled to the engine through suitable gearing (not shown). Accessory 18 may be any suitable device, such as a generator or air conditioning turbo-compressor, which is to be driven by a rotating shaft.

Upon occurrence of a malfunction in the accessory 18 or some other condition which makes it desirable to disconnect the accessory from the engine 12, a sensor means 20 will respond to a sensed change in condition and cause the engine accessory disconnect 10 to disconnect the rotor 16 from the driving shaft 14 so that operation of the accessory 18 may be swiftly terminated. The disconnect 10 of this invention also operates after disconnection to rapidly decelerate and stop the accessory rotor 16.

Figure 2:
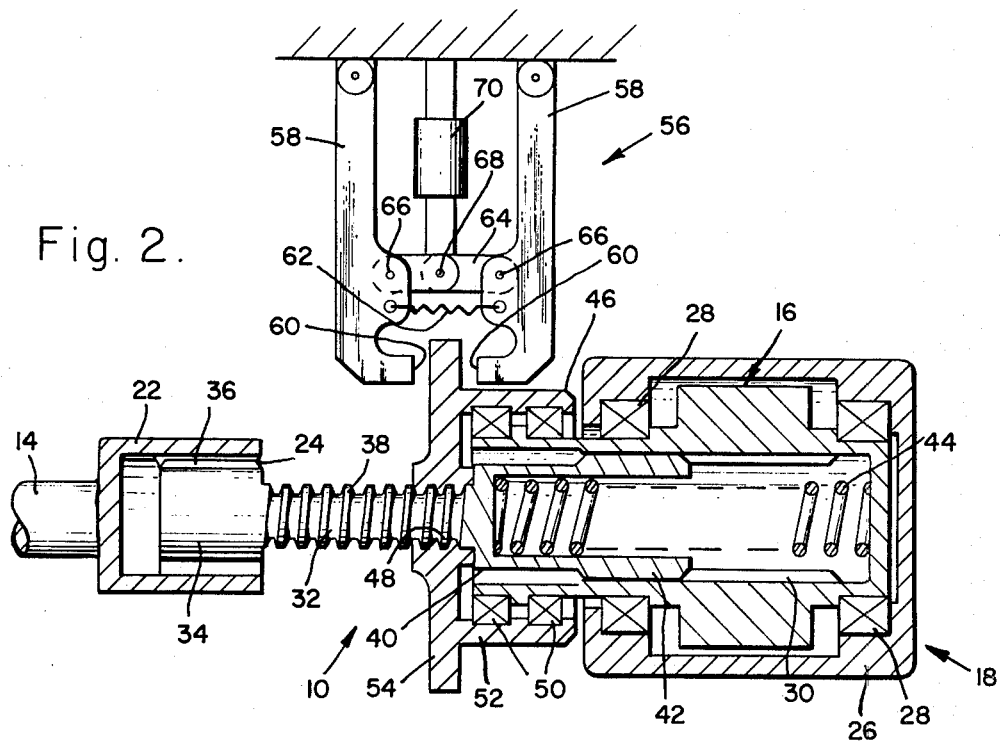
FIG. 2 is a cross-sectional view of the disconnect of FIG. 1.
Figure 3:
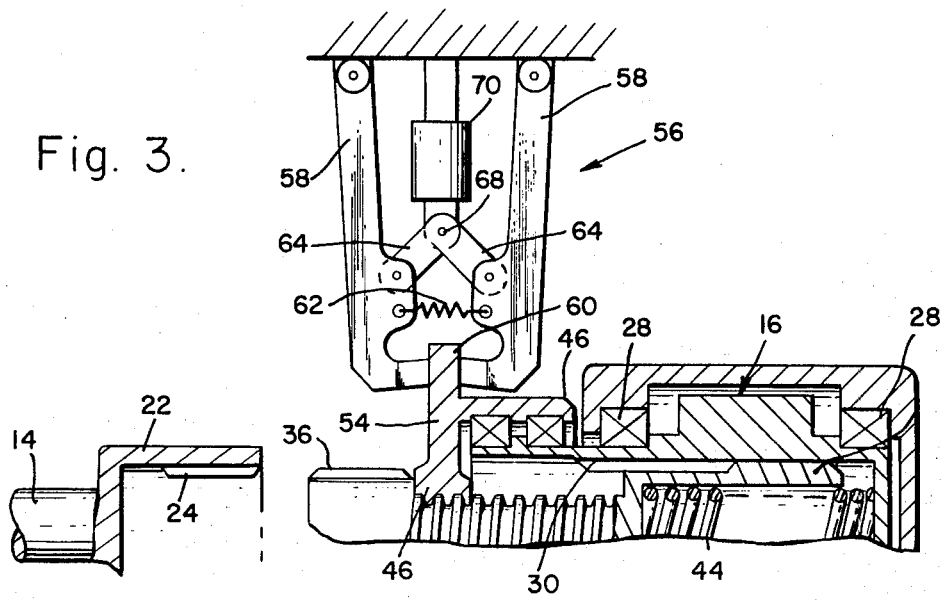
FIG. 3 is a fragmentary cross-sectional view, similar to FIG. 2 illustrating the disconnect after separation thereof.

An engine accessory disconnect 10 in accordance with this invention is illustrated in FIGS. 2 and 3 wherein the driving shaft 14 is shown as terminating in a tubular splined coupling member 22 having internal splines 24. The accessory rotor 16 is mounted for rotation on bearings 28 within a housing 26 of the accessory 18. The accessory rotor 16 is generally tubular and has splines 30 formed on an inner surface thereof. The particular configuration of the housing 26 and rotor 16 will depend upon the identity of the accessory 18, a general illustrative configuration being illustrated herein. If desired, instead of direct-coupling the driving shaft 14 to the rotor 16, a driven shaft could be interposed between the disconnect 10 and the accessory 18.

Open end portions of the tubular splined coupling member 22 and accessory rotor 16 are preferably in axial alignment facing each other for receiving an accessory drive connecting screw 32. A driving shaft connecting portion 34 is formed in one end of the accessory drive connecting screw 32 and has external splines 36 for engaging the splines 24 of the tubular spline coupling member 22 of the driving shaft 14. A central portion of the accessory drive connecting screw 32 is provided with suitable threads 38. At the end of the accessory drive connecting screw 32 opposite the driving shaft connecting portion 34 is a rotor connecting portion 40 which has external splines 42 for engaging the splines 30 of the accessory rotor 16. The rotor connecting portion 40 may itself be tubular in shape to receive one end of a reset spring 44 which is held in compression and urges the accessory drive connecting screw 32 away from the accessory rotor 16 to cause the driving shaft connecting portion 34 to be seated within the tubular splined coupling member 22.

Without provision of further structure, the reset spring 44 would hold the accessory drive connecting screw 32 in a position wherein it was secured by the splined couplings hereinabove described to both the driving shaft 14 and the rotor 16 so that rotation of the driving shaft 14 would transfer energy to the rotor 16 for operating the accessory 18.

To provide disengagement of the accessory rotor 16 from the engine 12, a brake nut 46 is mounted on the accessory drive connecting screw 32 with an internal threaded opening 48 engaging the thread 38 on the connecting screw 32. Bearings 50 may be provided for mounting a tubular portion 52 of the brake nut 46 on the accessory rotor 16 to facilitate relative rotation thereof. A brake disc portion 54 extends radially outward from the brake nut 46 to be engaged by a brake assembly 56. However, the use of alternative frictional engagement means, such as a hand brake, would not require the provision of such a disc portion.

The brake assembly 56 preferably has two brake plates 58 pivotally mounted with brake surface 60 positioned facing each other on opposite sides of the brake disc portion 54 of the brake nut 46. Any suitable means may be provided to cause engagement of the brake nut 46 by the brake surfaces 60. The brake plates 58 are drawn together by a brake spring 62 connected therebetween while a brake latch 64 is connected between hinges 66 on the brake plates 58 to lock in an extended position and prevent the brake spring 62 from drawing the brake plates together. A central joint 68 on the brake latch 64 is connected to a solenoid 70 which operates in response to a signal from the sensor means 20 (FIG. 1) indicating accessory malfunction to bend the joint 68 and remove interference of the brake latch 64 preventing braking operation of the brake assembly 56.

During normal operation, when it is desired that the accessory rotor 16 be driven by the engine 12, the engine accessory disconnect 10 maintains substantially the configuration illustrated in FIG. 2 with the splines 24 of the tubular splined coupling member 22 engaging the splines 36 of the driving shaft connecting portion 34 and the splines 42 of the rotor connecting portion 40 engaging the splines 30 of the accessory rotor 16 so that rotational motion of the driving shaft 14 is transferred through the accessory drive connecting screw 32 to the rotor 16. The brake plates 58 are held with the brake surfaces 60 removed from the brake disc portion 54 of the brake nut 46 by the brake latch 64 which is in its extended position.

Should the sensor means 20 detect some malfunction in the accessory 18 which will require it to be disconnected from the engine 12, the solenoid 70 is actuated, pulling on the joint 68 of the brake latch 64 so that it is folded in the manner shown in FIG. 3 and permits the brake spring 62 to pull the brake plates 58 together causing frictional engagement by the brake surfaces 60 against the brake disc portion 54 of the brake nut 46.

This braking action slows the rotation of the brake nut 46. However, the rate of rotation of the accessory driven connecting screw 32 remains equal to that of the driving shaft 14. Thus, relative rotational and axial motion of the accessory drive connecting screw 32 and the brake nut 46 will occur along the engaging threads 38 and 48. Because the brake nut 46 is fixed in position on the accessory rotor 26, which is in turn fixedly mounted, the accessory drive connecting screw is caused to move away from the tubular splined coupling member 22, compressing the reset spring 44 and disengaging the splined coupling between the tubular splined coupling member 22 and the driving shaft connecting portion 34. This action completely disconnects accessory rotor 16 from the engine 12.

Relative axial motion of the accessory drive connecting screw 32 and the brake nut 46 will continue until the brake nut has traveled to the end of the thread 38 and engaged the driving shaft connecting portion 34. Because the mass moment of inertia of the accessory rotor 16 is much greater than that of the brake nut 46, the brake nut is forced to speed up and assume the speed of the accessory rotor. Continued frictional engagement of the brake disc portion 54 by the brake surfaces 60 rapidly causes the brake nut 46, accessory drive connecting screw 32 and accessory rotor 26 to terminate rotation. The accessory rotor will generally stop within a few revolutions after the solenoid 70 has been actuated due to an indication of malfunction by the sensor 20. As can be readily understood, this prompt cessation of motion of the accessory rotor prevents the occurrence of substantial damage which might result from permitting the accessory to freewheel in accordance with prior practices.

To reconnect the accessory 18 to the engine 12, the solenoid 70 must be reset so that the brake latch 64 is moved back into position separating the brake surfaces 60 of the brake plates 58 from the brake disc portion 54 of the brake nut 46. By then turning the brake nut 46, the accessory drive connecting screw 32 will move axially along the splines 30 of the accessory rotor 26 until the driving shaft connecting portion is again seated within the tubular splined coupling member 22.

If it is desired, the disconnect 10 may be structured so that automatic reengagement will occur once the solenoid 70 has been reset. If the reset spring 44 is designed to provide a sufficient axial force while the threads 38 and 48 are designed to be nonjamming threads, having a large lead angle (generally on the order of 45 degrees), the force exerted by the reset spring 44 will move the accessory drive connecting screw 32 toward the tubular splined coupling member 22 and cause rotation of the brake nut 46 whenever the brake nut is free to turn. Thus, when resetting of the solenoid 70 disengages the brake assembly, the brake nut 46 will rotate and the accessory drive connecting screw 32 move axially until the driving shaft connecting portion 34 has been fully seated within the tubular splined coupling member 22. Thereupon, the axial motion will cease and the engine accessory disconnect 10 will be completely reset and in the position shown in FIG. 2 ready for further operation of the accessory 18 by the engine 12.

What is claimed is:

1. Disconnect apparatus comprising:
   driving means having an end portion;
   driven means having an end portion;
   connecting screw means having a threaded portion, a first end portion releasably engaging said driving means end portion, and a second end portion slidably engaging said driven means end portion for transmitting energy from said driving means to said driven means;
   nut means mounted on said connecting screw means and having a threaded portion engaging said connecting screw means threaded portion; and
   brake means for engaging said nut means for producing relative motion between said nut means and said connect-screw to cause disconnection of said first connecting screw end portion from said driving means end portion and to further cause rapid deceleration of motion of said driven means.

2. Disconnect apparatus as in claim 1 wherein said connecting screw means end portions engage said driving means end portion and said driven means end portion through splined couplings.

3. Disconnect apparatus as in claim 2 wherein said connecting screw moves axially away from said driving means upon engagement of said nut means by said brake means and including elongated splines on at least one of said driven means end portion and said connecting screw means second end portion for maintaining energy transmitting connection during axial motion of said connecting screw means.

4. Disconnect apparatus as in claim 3 including means for biasing said connecting screw means toward said driving means end portion.

5. Disconnect apparatus as in claim 4 wherein said biasing means comprises a reset spring for moving said connecting screw means into engagement of said driving means end portion upon release of said nut means by said brake means, and said connecting screw means and nut means threads have a large lead angle for permitting relative motion of said connecting screw means and said nut means upon release by said brake means.

6. Disconnect means as in claim 3 wherein said brake means comprises:
   brake plate means positioned with brake surfaces adjacent said nut means;
   means for causing engagement of said nut means by said brake surfaces;
   means for preventing engagement of said nut means by said brake surfaces; and
   means for releasing said engagement preventing means in response to a stimulus.

7. Disconnect means as in claim 6 wherein said nut means has a disc portion, said engagement means comprises brake spring means for urging said brake plate means toward said nut means, disc portion and said engagement preventing means comprises latch means having a first position holding said brake plate means away from said nut means disc portion and a second position permitting motion of said brake plate means toward said nut means disc portion.

8. Disconnect means as in claim 7 wherein said releasing means comprises actuator means responsive to a stimulus to change said latch means from said first position to said second position.

9. Disconnect means as in claim 1 wherein said driving means comprises an engine shaft.

10. Disconnect means as in claim 9 wherein said shaft is gear coupled to an engine.

11. Disconnect means as in claim 1 wherein said driven means comprises an accessory rotor.

12. Disconnect means as in claim 1 wherein said driven means comprises a shaft.

13. An accessory drive system for transmitting energy from an engine to an accessory, said system comprising:
   an engine;
   a driving shaft for transmitting energy from said engine and having an extended end portion;
   an accessory having a rotor;
   coupling means for rotationally coupling said extended end portion of said driving shaft and said rotor;
   disconnect means operable to cause translational movement of said coupling means to thereby disconnect said coupling means from said drive shaft during rotation thereof; and
   brake means for frictionally engaging said disconnect means to cause disconnecting of said coupling means from said driving shaft and to further cause rapid termination of rotation of said rotor.

14. An accessory drive system as in claim 13 wherein said coupling means comprises connecting screw means having a threaded portion, a first end portion releasably engaging said driving shaft end portion, and a second end portion slidably engaging said rotor for transmitting energy from said driving shaft to said rotor.

15. An accessory drive system as in claim 14 wherein said disconnect means includes nut means mounted on said connecting screw means and having a threaded portion engaging said connecting screw means threaded portion and adapted for engagement by said brake means such that relative rotary motion of said nut means and said connecting screw means produces axial motion of said connecting screw means for disconnecting said driving shaft from said rotor.

16. An accessory drive system as in claim 15 including means for limiting relative rotation of said connecting screw means and nut means such that continued engagement of said nut means by said brake means after disconnecting of said driving shaft and said rotor rapidly terminates rotation of said rotor.

17. An accessory drive system as in claim 16 wherein said connecting screw means end portion engages said driving shaft portion and said rotor through splined couplings.

18. An accessory drive system as in claim 17 wherein said splined couplings include elongated splines on at least one of said rotor and said connecting screw means second end portion for maintaining energy transmitting connection during axial motion of said connecting screw means.

19. An accessory drive system as in claim 18 including means for biasing said connecting screw means toward said driving shaft end portion.

20. An accessory drive system as in claim 19 wherein said biasing means comprises a reset spring for moving said connecting screw means into engagement of said driving shaft end portion upon release of said nut means disc portion by said brake means, and said connecting screw means and nut means threads have a large lead angle for permitting relative motion of said connecting screw means and said nut means upon release by said brake means.

21. An accessory drive system as in claim 15 wherein said brake means comprises:
   brake plate means positioned with brake surfaces adjacent said nut means;
   means for causing engagement of said nut means by said brake surfaces;
   means for preventing engagement of said nut means by said brake surfaces; and
   means for releasing said engaging preventing means in response to a stimulus.

22. An accessory drive system as in claim 21 wherein said engagement means comprises brake spring means for urging said brake plate means toward said nut means, and said engagement preventing means comprises latch means having a first position holding said brake plate means away from said nut means and a second portion permitting motion of said brake plate means toward said nut means.

23. An accessory drive system as in claim 22 wherein said releasing means comprises:
   sensor means connected for producing a signal upon detection of malfunction of said accessory; and
   actuator means responsive to said signal to change said latch means from its first position to said second position.

24. An accessory drive system as in claim 13 including sensor means coupled between said accessory and said brake means to effect disconnection of said engine from said accessory rotor upon detection of a malfunction of said accessory.

25. An accessory drive system as in claim 13 including a driven shaft between said coupling means and said accessory rotor.

26. An accessory drive system as in claim 13 including gearing means between said engine and said driving shaft.

27. A method of preventing damage from an engine driving an accessory after malfunction of said accessory, said method comprising the steps of:
   coupling a connecting screw between an engine and an accessory rotor;
   securing a threaded portion of said connecting screw within a threaded opening of a disconnect nut;
   operating said engine to transmit driving energy through said connecting screw to said accessory rotor;
   detecting malfunction of said accessory;
   responsive to said malfunction, frictionally engaging said disconnect nut to produce relative rotational motion of said disconnect nut and connecting screw to disconnect said connecting screw by axial motion thereof from said engine;
   terminating relative rotation of said disconnect nut and said connecting screw; and
   continuing frictional engagement of said disconnect nut to effect rapid deceleration of said accessory rotor.

28. The method of claim 27 wherein spring means are provided for urging said connecting screw toward said engine coupling and including the additional step of releasing frictional engagement of said disconnect nut upon termination of said malfunction to permit relative rotation of said disconnect nut and said connecting screw to recouple said connecting screw by axial motion thereof to said engine.

29. An accessory drive system comprising:
   (a) a driving mechanism having a rotatably mounted output member;
   (b) a driven accessory having a rotatably mounted input member;
   (c) connecting means extending between said output and input members and linking the same for conjoint rotation, said connecting means having:
      (1) a first end portion slidably and releasably engaging said output member;
      (2) a second end portion slidably engaging said input member,
      (3) a threaded portion positioned between said first and second end portions;
   (d) disconnect means circumscribing and threadingly engaging said threaded portion of said connecting means, and adapted to rotate therewith during conjoint rotation of said output and input members; and
   (e) brake means for retarding rotation of said disconnect member to sequentially cause:
      (1) movement of said connecting means toward said input member and out of engagement with said output member,
      (2) engagement between said first end portion of said connecting means and said disconnect member in a manner precluding relative rotation therebetween, and
      (3) rapid rotational deceleration of said input member.

30. Disconnect apparatus comprising:
   (a) engine means having a rotatably mounted output member;
   (b) accessory means having a rotatably mounted input member;
   (c) a connecting member having an axis and opposite end portions spaced apart along said axis, each of said end portions being spline-connected to one of said output and input members; and
   (d) means responsive to a malfunction of said accessory means during operation thereof by said engine means for axially disengaging said connecting member from said output member and then interacting with said connecting member to rapidly decelerate and stop rotation of said input member to protect said accessory means.

31. A rotationally drivable accessory apparatus, such as a generator, compressor or the like, comprising:
   (a) a housing:
   (b) an input member carried by said housing for rotation relative thereto about an axis of said input member;
   (c) connecting screw means, associated with said input member for parallel axial movement relative thereto, for releasably coupling said input member to a rotating output member of a driving mechanism for conjoint rotation with the output member;
   (d) disconnect nut means carried by said housing for rotation relative thereto, said nut means threadingly engaging said connecting screw means and being operable to:
      (1) cause axial retraction motion of said connecting screw means to disconnect the same from the rotating output member, and
      (2) coact with the disconnected screw means to rapidly terminate continued rotation of said input member; and
   (e) brake means for frictionally engaging said disconnect nut means to cause operation thereof.

32. The accessory apparatus of claim 31 further comprising means for automatically returning said connecting screw means to an extended position upon release of said brake means subsequent to disconnection of said connecting screw means from the output member.

33. The accessory apparatus of claim 32 wherein said means for automatically returning said connecting screw means to an extending position include spring means biasing said connecting screw means toward said extended position, and cooperating large lead angle thread means on said connecting screw means and disconnect nut means.

* * * * *